United States Patent [19]

Belisomi et al.

[11] 4,344,090
[45] Aug. 10, 1982

[54] TELEVISION SET WITH PICTURE-STORAGE MEANS

[75] Inventors: Pietro Belisomi, Pinerolo; Attilio Farina, Turin, both of Italy

[73] Assignee: Indesit Industria Elettrodomestici Italiana S.p.A., Italy

[21] Appl. No.: 75,274

[22] Filed: Sep. 13, 1979

[30] Foreign Application Priority Data

Sep. 25, 1978 [IT] Italy ................ 69195 A/78

[51] Int. Cl.$^3$ .................. H04N 5/44; H04N 9/535
[52] U.S. Cl. .................. 358/183; 358/22; 358/181
[58] Field of Search ............ 358/10, 181, 183, 22; 340/714, 744, 750, 799, 798, 725

[56] References Cited

U.S. PATENT DOCUMENTS

| | | | |
|---|---|---|---|
| 3,566,361 | 2/1971 | Lavertu et al. | 340/750 |
| 3,685,039 | 8/1972 | Flanagan | 340/799 |
| 3,735,383 | 5/1973 | Naka | 340/750 |
| 3,795,762 | 3/1974 | Willis | 358/21 |
| 3,836,902 | 9/1974 | Okuda et al. | 340/747 |
| 4,020,501 | 4/1977 | Hillberger | 340/725 |
| 4,089,026 | 5/1978 | Wilhelm et al. | 358/10 |
| 4,139,860 | 2/1979 | Micic | 358/181 |
| 4,151,557 | 4/1979 | Iida et al. | 358/181 |

Primary Examiner—Michael A. Masinick
Attorney, Agent, or Firm—Ostrolenk, Faber, Gerb & Soffen

[57] ABSTRACT

A television set having a picture display device, means for tuning into selected radiated television signals and means for supplying the received signal pictures to the said display device, the set further comprising a preferably non-volatile memory containing coded data corresponding to at least one full picture other than the pictures contained in the received signal, and means for reading and decoding the data in the memory and supplying a signal to the said display device to display the stored data visually.

10 Claims, 3 Drawing Figures

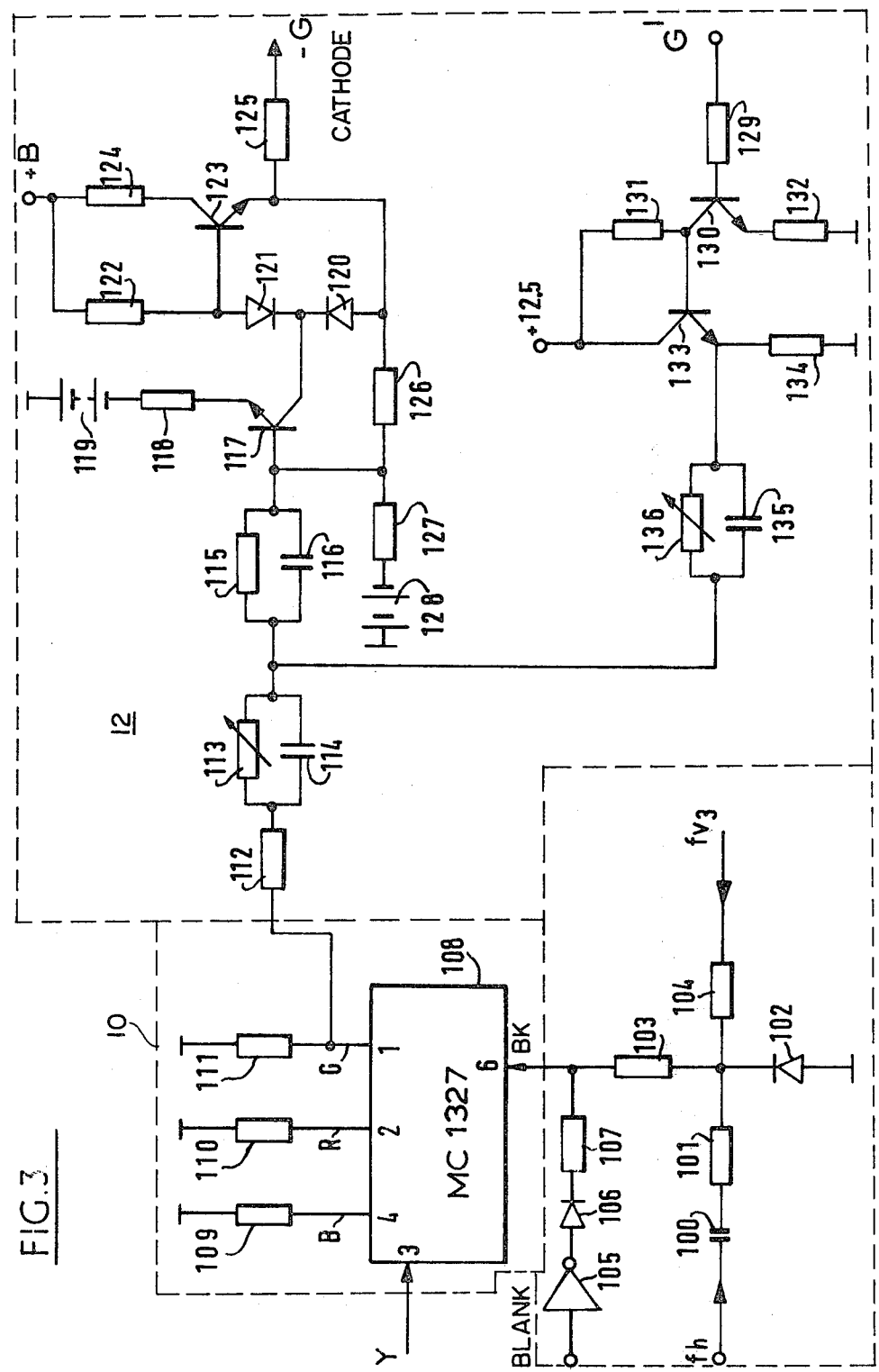

TELEVISION SET WITH PICTURE-STORAGE MEANS

BACKGROUND OF THE INVENTION

The present invntion relates to a television set including a picture display device, means for selecting radiated television signals and means for supplying the received signal pictures to the display device. It is known to display pictures other than those contained in the received video signal on a television screen either as an alternative to the received video signal or by superimposing them on the said video signal pictures.

This is done, for example, when a television set is fitted with a videodisc reader or teletext signal decoder, provided the videodiscs and relative transmissions are available in each case respectively. It is often useful, however, to be able to display pictures other than those contained in the received video signal without having to depend on outside factors such as the disc reader, the discs themselves or teletext transmissions.

For example it is often desirable to display information concerning the use of the set or even advertising information when the set is installed at an exhibition or in a shop window. The primary object of the present invention is to provide a simple solution to this requirement.

SUMMARY OF THE INVENTION

With this object in mind, the present invention relates to a television set having a picture display device, provided with means for selecting radiated television signals as well as means for supplying the received signal pictures to the said display device, characterized by the fact that it includes semiconductor non-volatile memory means containing coded data corresponding to at least one full picture other than the pictures contained in the received signal, and means for decoding the coded data and supplying it to the said display device for display in the form of pictures either as an alternative or superimposed on the pictures contained in the received signal.

BRIEF DESCRIPTION OF THE INVENTION

The invention will now be described in detail with reference to the attached drawings, provided by way of a non-limiting example, in which:

FIG. 3 shows a second part of the FIG. 1 circuits in more detail.

DETAILED DESCRIPTION OF THE INVENTION

Figure 1:
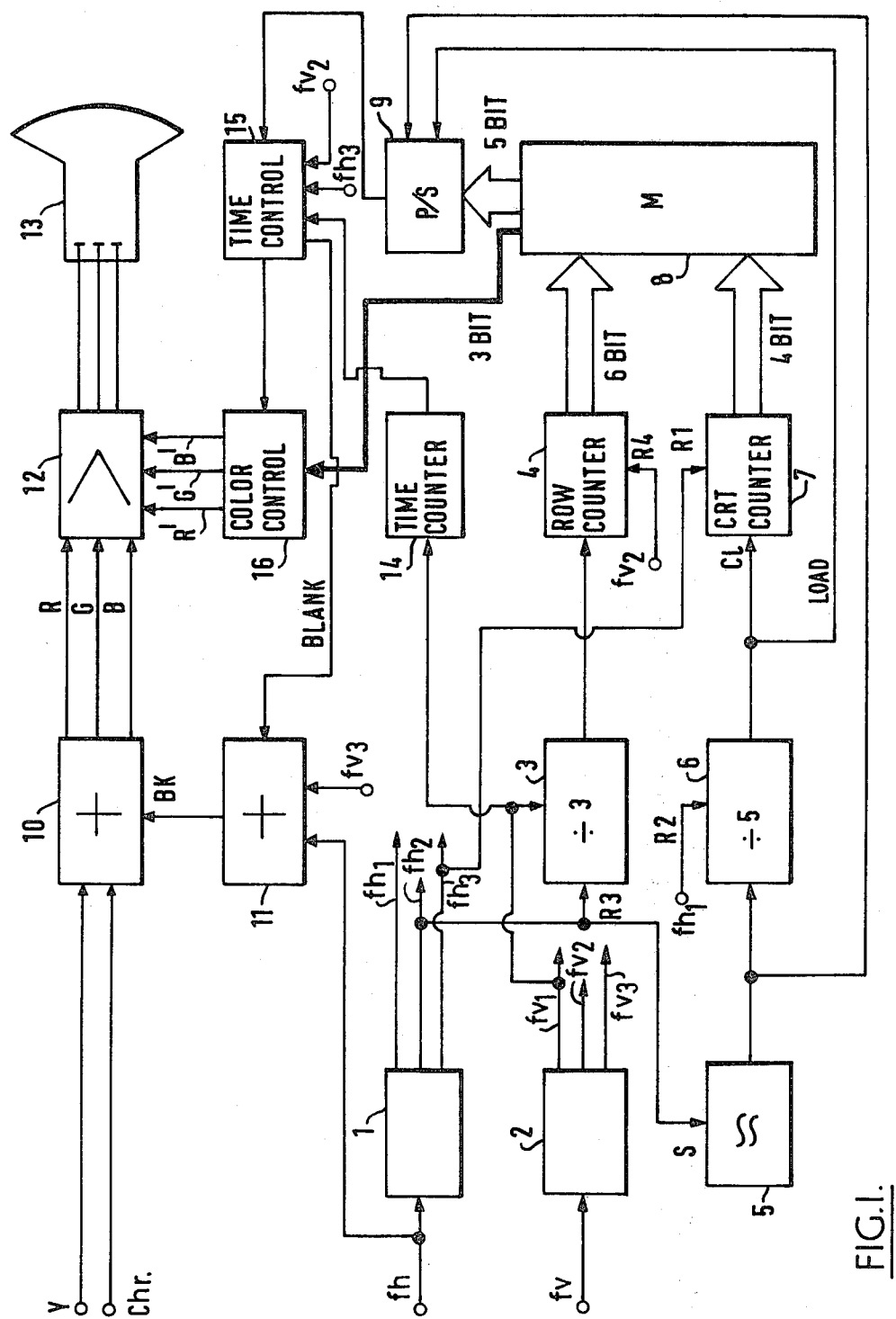
FIG. 1 shows the block diagram of part of the circuits on a color television set according to the present invention.

Letter Y in FIG. 1 indicates the luminance signal, separated from the received television signal in the known way. Chr indicates the chrominance signal (at subcarrier frequency), also separated from the received signal in the known way. fh indicates the line flyback signal, picked up in the known way from the line deflection circuits and fv indicates the frame flyback signal, also picked up in the known way from the relative deflection circuits.

Signals Y and Chr are supplied to color demodulating and adding block 10 which also receives a blanking signal BK from an adding block 11. Block 10 sends out three color signals, R, G and B, to block 12 containing the final video amplifiers for piloting a color tube 13. Signal fh is supplied to both block 11 and a block 1 which supplies three output signals, namely: fh1, supplied to the reset input R2 of a divider 6 which divides by 5; fh2, supplied to inpart R3 of a divider circuit 3, which divides by 3, and also to the synchronizing inputs of an oscillator 5; and fh3, supplied to the reset input R1 of a 4-bit counter 7 and also to switch circuit 15.

Signal fv is supplied to a circuit 2 which supplies three output signals; fv1, supplied to the input of timer circuit 14 and to an input of the divider circuit 3; fv2, supplied to the reset input R4 of a 6-bit counter circuit 4 and to switch circuit 15; fv3 supplied to adding block 11. The output of oscillator circuit 5 is connected to divider 6, the output of which is connected to counter 7, counter 7 supplies the first four address bits to memory circuit 8 (ROM 1024X8).

The output of divider 3 is connected to the clock input of counter 4, which supplies the other six address bits to memory 8.

Five data output bits of memory 8 are sent to parallel-series converter circuit 9, which also receives a LOAD signal from the output of divider 6 and the clock signal from oscillator 5.

The output of circuit 9 is connected to time control circuit 15, which also receives a control signal from time counter circuit 14 and, responsive to the control signal, supplies a BLANK signal to circuit 11 and allows the signal received from circuit 9 to pass to color control circuit 16.

Circuit 16 is a control circuit which, depending on the 3 bit signal received from memory 8, sends the signal received from circuit 15 to one or more of inputs R', G' and B' of amplifier circuit 12.

Figure 2:
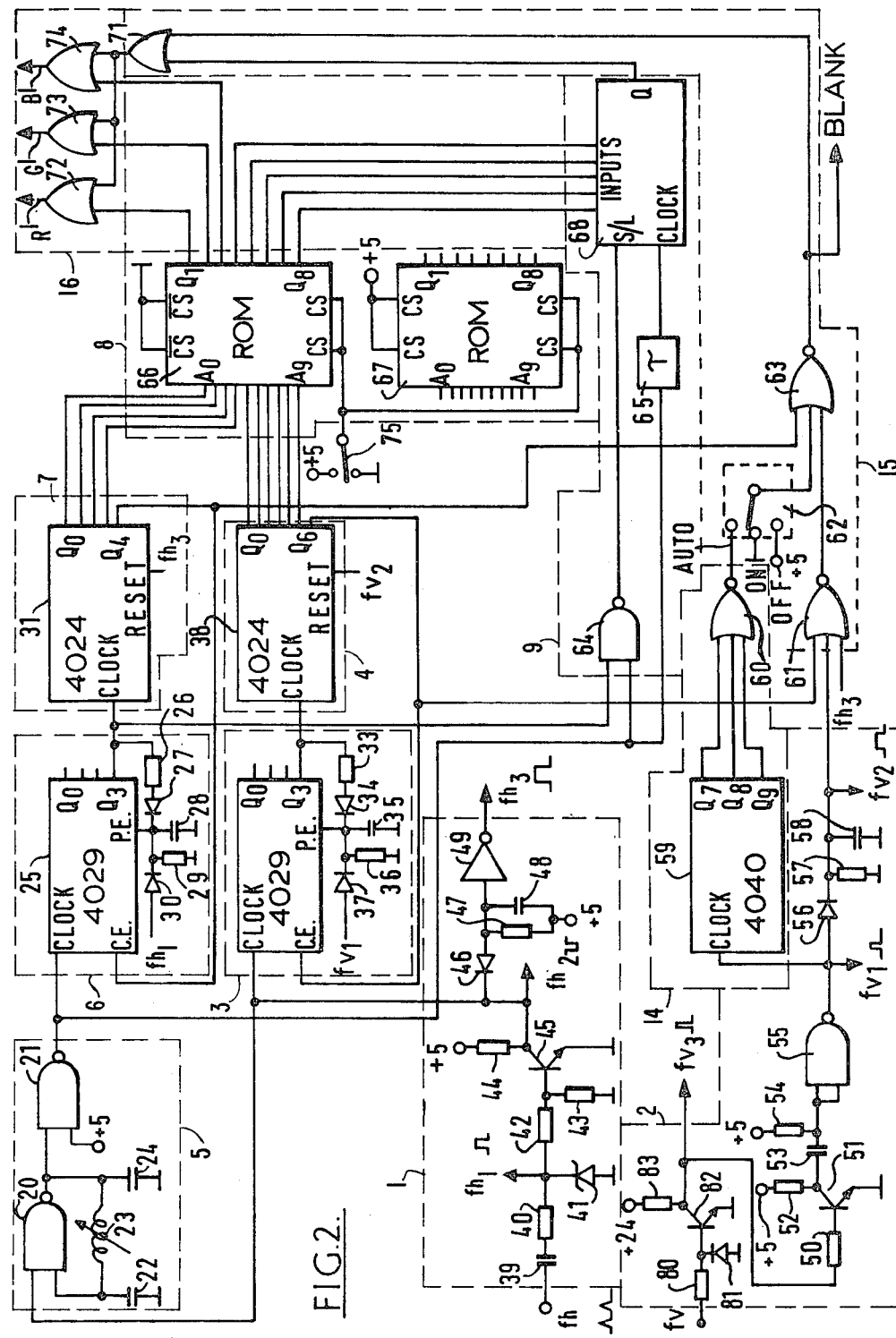
FIG. 2 shows a first part of the FIG. 1 circuits in more detail.

FIG. 2 shows in more detail the circuit formed by blocks 1, 2, 4, 5, 6, 7, 8, 9, 14, 15 and 16 in FIG. 1. Block 1 in FIG. 2 consists of the components indicated by numerals 39 to 49 and produces, responsive to flyback pulse fh, three signals, fh1, fh2 and fh3, for piloting the circuits downstream.

Block 2 in FIG. 1 consists of the components indicated by numerals 50 to 58 and 80 to 83. This produces, in the same way, responsive to vertical flyback pulse fv, three signals, fv1, fv2 and fv3, with appropriate characteristics for piloting the circuits downstream.

Block 3 in FIG. 1 (which divides by 3) consists of the parts indicated by numerals 32 to 37. Block 32 is an RCA Corporation 4029 CMOS counter, preset to 5, which receives the preset pulse both from output with weight 8 (resistor 33 and diode 34) and signal fv1 (diode 37). The function of the resistor 46-condenser 35 assembly is to provide the output pulse with the appropriate width. Block 4 in FIG. 1 (row counter) consists of an RCA Corporation 4024 7-bit CMOS counter 38 which receives a clock signal every three scanning lines from block 3 and is reset by the vertical-frequency signal fv2. Six output bits supply memory block 8 (FIG. 1) with six addresses. The seventh bit is sent to the clock enable input of divider 3 and to an input of time control circuit 15. The function of this signal is to determine where the picture ends vertically.

Block 5 in FIG. 1 (oscillator) consists of the parts indicated by numerals 20 to 24. The two NAND gates, 20 and 21, form half of an RCA Corporation 4011 CMOS integrated circuit. Adjustable coil 23 determines the clock frequency (about 2 Mhz) and, consequently, the width of one picture element.

Divider 6 in FIG. 1 (which divides by 5) consists of the parts indicated by numerals 25 to 30. This is identical to divider 3, already described, the only difference being that it is preset to 3 for dividing by 5 (because 8−3=5). Counter 7 in FIG. 1 consists of part 31, which is a 4024 counter identical to row counter 4. This counts the picture line elements in groups of 5 and supplies memory 8 with the remaining four address bits. The fifth bit is sent to the clock enable input of counter 25 and to an input of time control circuit 15 for determining where the picture ends horizontally.

Memory 8 of FIG. 1 consists of a 1024X8 ROM 66, type 93464 made by the Fairchild Camera & Instrument Corporation. As already explained, this receives the addresses (ten bits) from counters 31 and 38 and supplies 5 output data bits to P/S converter and a further 3 output data bits to control circuit 16. This ROM contains a picture page (5120 elements) divided into 64 lines of 80 elements each. Each 80-element line is contained in 16 (8-bit) memory cells, each of which supplies five picture elements plus three color control bits. FIG. 2 shows a second memory 67, identical to the first and connected to it in parallel as far as data and addresses are concerned. Either of these two memories can be activated manually by means of switch 75 for displaying two different alternative pictures. The number of picture pages can be increased, of course, by simply increasing the number of memories available. It also goes without saying that the ROM can be replaced with a programmable read only memory (PROM), e.g. type 93451, or an EPROM, type 2708, made by the Fairchild Corporation, or other equivalents.

P/S converter 9 in FIG. 1 consists of the parts indicated by numbers 64, 65 and 68. Part 68 is a Fairchild 74165 8-bit shift register for parallel-series conversion of the 5 data bits supplied by memory 66. Part 65 is a delay circuit (for delaying the clock signal by about 300 nanoseconds to obtain the exact timing with the LOAD signal). The function of part 64 (NAND gate) is to obtain a LOAD pulse of suitable length from the signal supplied by counter 25.

Time counter 14 in FIG. 1 consists of parts 59 and 60. Part 59 is an RCA 4040 CMOS 12-stage divider which supplies three output signals to 3-input OR gate 60. These three signals are output on the seventh, eighth and ninth output terminals of the divider 59. The output of gate 60 is connected to an input of circuit 15. Time control circuit 15 consists of the parts indicated by numerals 61, 62, 63 and 71. Part 61 is an OR gate with three inputs which receive the end-of-page signal from counter 38, line blanking signal fh3, and frame blanking signal fv2. Part 63 is a three-input OR gate identical to gates 60 and 61 (these three gates form a single RCA 4075 integrated circuit). The three inputs of gate 63 receive the end-of-line signal from counter 31, the output signal from gate 61 and the output signal of 3-position switch 62. Switch 62 has three positions: AUTO for connecting the output of timer 14, ON for connecting the ground potential and OFF for connecting supply (+5 V). The output of gate 63 supplies a "BLANK" signal to circuit 11 and to a first input of 2-input OR gate 71. The second input of gate 71 receives the output signal of converter 68. The output of gate 71 supplies the input signal to circuit 16. Color control circuit 16 in FIG. 1 consists of the parts indicated by numerals 72 to 74. These are three 2-input OR gates which, together with gate 71, form a single RCA 4071 integrated circuit. The first inputs of the three gates 72–74 receive the output signal from gate 71. The second inputs receive the three color control bits from ROM 66 (or ROM 67). The three outputs supply signals R', G' and B' respectively to circuit 12 in FIG. 1.

FIG. 3 shows the circuit formed by FIG. 1 blocks 10, 11 and 12 in more detail. Adding circuit 10 in FIG. 1 corresponds to the parts indicated by 108 to 111 in FIG. 3. Part 108 is a Motorola 1327 matrix and color signal demodulating integrated circuit. Parts 109, 110 and 111 are the three load resistors for the circuit 108 on which color signals R, G and B are made available.

Circuit 108 receives brightness signal Y on terminal 3 and blank signal bk from adding circuit 11 on terminal 6. The other terminals on circuit 108 are taken to be connected in the usual way as instructed by the manufacturer. The following description relates to a single final video circuit relative to the color green (signal G). The red and blue circuits (signals R and B) are taken to be identical. Adding circuit in FIG. 1 consists of the parts indicated by numerals 102 to 107. This performs the addition of line flyback fh, frame flyback fv3 and "BLANK" signals and supplies the compound blank signal bk to circuit 108. Amplifier circuit 12 in FIG. 1 consists of the parts indicated by numerals 112 to 136. Parts 112 to 125 form a push-pull final video amplifier of the known type. Parts 129 to 136 form an adding stage and level adapter for adding signal G' from circuit 16 to signal G from block 108. The function of rheostats 113 and 136 is to regulate the levels (white level) of the received video signal and the internal signal received from memory 8 respectively.

The following table shows, by way of example, the values of the main components used on the circuit described:

| Table of values: | |
|---|---|
| 20 - IC ¼ 4011 | 21 - IC ¼ 4011 |
| 22 - C 120 pF | 24 - C 180 pF |
| 25 - IC 4029 | 26 - R 1 Kohm |
| 27 - D 1N4148 | 28 - C 18 pF |
| 29 - R 10 Kohm | 30 - D 1N4148 |
| 31 - IC 4024 | 32 - IC 4029 |
| 33 - R 1 Kohm | 34 - D 1N4148 |
| 35 - C 18 pF | 36 - R 10 Kohm |
| 37 - D 1N4148 | 38 - IC 4024 |
| 39 - C 47 nF | 40 - R 22 Kohm |
| 41 - Zener 4.7 V | 42 - R 47 Kohm |
| 43 - R 47 Kohm | 44 - R 1 Kohm |
| 45 - TR BC238 | 46 - D 1N4148 |
| 47 - R 120 Kohm | 48 - C 4.7 pF |
| 49 - IC 1/6 4069 | 50 - R 56 Kohm |
| 51 - Tr BC238 | 52 - R 1 Kohm |
| 53 - C 6.7 nF | 54 - R 560 Kohm |
| 55 - IC ¼ 4011 | 56 - D 1N4148 |
| 57 - R 560 Kohm | 58 - C 9.6 nF |
| 59 - IC 4040 | 60 - IC ⅓ 4075 |
| 61 - IC ⅓ 4075 | 63 - IC ⅓ 4075 |
| 64 - IC ¼ 4011 | 66 - ROM 93464 |
| 67 - ROM 93464 | 68 - IC 74165 |
| 71 - IC ¼ 4071 | 72 - IC ¼ 4071 |
| 73 - IC ¼ 4071 | 74 - IC ¼ 4071 |
| 80 - R 1 Kohm | 81 - D 1N4148 |
| 82 - TR BC 238 B | 83 - R 5.6 Kohm |
| 100 - C 100 nF | 101 - R 10 Kohm |
| 102 - D 1N4148 | 103 - R 10 Kohm |
| 104 - R 2.2 Kohm | 105 - IC 1/6 4069 |
| 106 - D 1N4148 | 107 - R 10 Kohm |
| 108 - IC MC 1327 | 109 - R 15 Kohm |
| 110 - R 15 Kohm | 111 - R 15 Kohm |
| 112 - R 100 ohm | 113 - R 2.2 Kohm pot. |
| 114 - C 18 pF | 115 - R 1.5 Kohm |
| 116 - C 56 pF | 117 - TR BF392 |

Table of values:

- 118 - R 6.8 ohm
- 121 - D 1N4148
- 123 - TR BF392
- 125 - R 470 ohm
- 127 - R 1 Kohm
- 130 - TR BC238
- 132 - R 1 Kohm
- 134 - R 4.7 Kohm
- 120 - D 1N4148
- 122 - R 39 Kohm
- 124 - R 1 Kohm
- 126 - R 47 Kohm
- 129 - R 4.7 Kohm
- 131 - R 1 kohm
- 133 - TR BC238
- 135 - C 18 pF

Table of values:

- 136 - R 4.7 Kohm Pot.

Note:
For the sake of brevity, the following abbreviations have been used:
IC = integrated circuit
C = condenser
R = resistor
D = diode
TR = transistor The following table shows, by way of an example, the content of a ROM memory in hexadecimal notation. For the sake of brevity, the addresses have been left out and it is assumed that the data listed from left to right and from top to bottom correspond, in order, to memory cells from address 000 to address 3FF.

ROM table:

| | | | | | | | | | | | | | | | |
|---|---|---|---|---|---|---|---|---|---|---|---|---|---|---|---|
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | F0 | 70 | 70 | 78 | FF | FF | FF | FF | FF | FF | FF |
| FF | FF | FF | FF | FF | F0 | 68 | A8 | A8 | B0 | 78 | FF | FF | FF | FF | FF |
| FF | FF | FF | FF | F0 | 68 | A8 | A8 | A8 | A8 | B0 | 78 | FF | FF | FF | FF |
| FF | FF | FF | FF | E8 | A8 | B0 | 70 | 70 | 68 | A8 | B8 | FF | FF | FF | FF |
| FF | FF | FF | FF | E8 | B0 | 00 | 00 | 00 | 00 | 68 | B8 | FF | FF | FF | FF |
| FF | FF | FF | FF | F0 | 00 | FF | FF | FF | FF | 00 | 78 | FF | FF | FF | FF |
| FF | FF | FF | FF | E0 | FF | 80 | 00 | 00 | 00 | FF | 38 | FF | FF | FF | FF |
| FF | FF | FF | FF | FF | 80 | 78 | FF | FF | F0 | 08 | FF | FF | FF | FF | FF |
| FF | FF | FF | FF | F0 | 38 | C0 | 00 | 00 | 18 | E0 | 78 | FF | FF | FF | FF |
| FF | FF | FF | FF | F0 | 80 | 38 | F8 | F8 | E0 | 08 | 78 | FF | FF | FF | FF |
| FF | FF | FF | FF | F0 | D8 | F8 | C6 | 1E | F8 | D8 | 78 | FF | FF | FF | FF |
| FF | FF | FF | FF | FF | 58 | F8 | E6 | 3E | F8 | D0 | FF | FF | FF | FF | FF |
| FF | FF | FF | FF | FF | 68 | F8 | E6 | 3E | F8 | B0 | FF | FF | FF | FF | FF |
| FF | FF | FF | FF | FF | A8 | F8 | E6 | 3E | F8 | A8 | FF | FF | FF | FF | FF |
| FF | FF | FF | FF | FF | B0 | F8 | E6 | 3E | F8 | 68 | FF | FF | FF | FF | FF |
| FF | FF | FF | FF | FF | D0 | F8 | E6 | 3E | F8 | 58 | FF | FF | FF | FF | FF |
| FF | FF | FF | FF | FF | D8 | 78 | E6 | 3E | F0 | D8 | FF | FF | FF | FF | FF |
| FF | FF | FF | FF | FF | E8 | 18 | C6 | 1E | C0 | B8 | FF | FF | FF | FF | FF |
| FF | FF | FF | FF | FF | E0 | E0 | F8 | F8 | 38 | 38 | FF | FF | FF | FF | FF |
| FF | FF | FF | FF | FF | FF | 38 | 38 | E0 | E0 | FF | FF | FF | FF | FF | FF |
| FF | FF | FF | FF | FF | FF | C8 | C8 | 98 | 98 | FF | FF | FF | FF | FF | FF |
| FF | FF | FF | FF | FF | FF | F0 | 70 | 70 | 78 | FF | FF | FF | FF | FF | FF |
| FF | FF | FF | FF | FF | FF | 90 | 48 | FF | FF | FF | FF | FF | FF | FF | FF |
| FF | FF | FF | FF | FF | FF | FF | E0 | 38 | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| C2 | 62 | 7A | F2 | 22 | 02 | 7A | 82 | 02 | 3A | 02 | 02 | C2 | 62 | 02 | 02 |
| E2 | F2 | 7A | FA | 72 | 7A | 9A | CA | FA | F2 | 3A | FA | E2 | FA | E2 | FF |
| E2 | F2 | 3A | FA | 72 | 7A | EA | CA | FA | F2 | 7A | FA | E2 | FA | E2 | FF |
| E2 | F2 | 1A | FA | 72 | 7A | EA | CA | FA | F2 | 3A | FA | E2 | FA | E2 | FF |
| E2 | F2 | 0A | FA | 72 | 7A | F2 | CA | FA | FA | 1A | FF | E2 | FA | E2 | FF |
| E2 | F2 | 42 | FA | 72 | 7A | F2 | CA | FA | FA | 8A | FA | E2 | FA | E2 | FF |
| E2 | F2 | 62 | FA | 72 | 7A | F2 | CA | FA | FA | C2 | FA | E2 | FA | E2 | FF |
| E2 | F2 | 72 | 3A | 72 | 7A | F2 | C2 | 02 | FA | E2 | 7A | FA | E2 | FA | FF |
| E2 | F2 | 7A | 1A | 72 | 7A | F2 | CA | FA | FA | F2 | 3A | E2 | FA | E2 | FF |
| E2 | F2 | 7A | 8A | 72 | 7A | F2 | CA | FA | FA | FA | 1A | E2 | FA | E2 | FF |
| E2 | F2 | 7A | C2 | 72 | 7A | F2 | CA | FA | FA | FA | 8A | E2 | FA | E2 | FF |
| E2 | F2 | 7A | E2 | 72 | 7A | EA | CA | FA | FA | FA | C2 | E2 | FA | E2 | FF |
| E2 | F2 | 7A | F2 | 72 | 7A | EA | CA | FA | FA | FA | E2 | E2 | FA | E2 | FF |
| E2 | F2 | 7A | FA | 72 | 7A | 9A | CA | FA | FA | FA | C2 | E2 | FA | E2 | FF |
| C2 | 62 | 3A | FA | 22 | 02 | 7A | 82 | 02 | 72 | 02 | 0A | C2 | 7A | C2 | 7A |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

-continued

ROM table:

| FF | FF | FF | FF | FF | FF | FF | FF | FF | FF | FF | FF | FF | FF | FF | FF |
|----|----|----|----|----|----|----|----|----|----|----|----|----|----|----|----|
| FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF |

Operation of the circuit will be clear from the Figures and foregoing description. For greater clarity, however, the following points should be noted:

The circuit can operate in three different modes depending on the position of switch 62:

In the OFF position, the +5 V at gate 63 renders the BLANK signal high so that gates 71, 72, 73 and 74 are locked to high at the output and transistor 133 (and corresponding ones for the other two colors) is disabled and the BLANK signal is not supplied to the bk input of circuit 108. In this position, the received television signal picture is displayed.

In the ON position, the ground potential is applied to gate 63 so that a combination of flyback signals fh3 and fv2 and end-of-line and page signals from counters 31 and 38 is available at its output. The data from memory 8 are enabled for supply to amplifier 12 and are displayed whereas supply of the signal contained in the received television signal is disabled by the BLANK signal at the bk input of circuit 108.

In the AUTO position, gate 63 receives a signal normally of +5 V which switches to zero for only 2.56 out of 20.48 seconds so as to display the local page (contained in memory 8) automatically for 2.56 seconds. For the remaining 17.92 seconds, the received television signal is displayed. This is possible because the output of gate 60 is only low when all three of its inputs are at 0 (20 milliseconds × two to the seventh = 2560 milliseconds).

Circuits 1 and 2 provide signals fv2 and fh3 for resetting counters 31 and 38 with a sufficient length for the picture stored in memory 8 to appear in the center of the television screen. The end of the local picture horizontally (end of line) and vertically (end of frame) is determined automatically at the seventeenth count of counter 31 and the sixty-fifth count of counter 38 when the pulses at from the outputs Q4 of counter 31 and Q6 of counter 38 disable the clock signals of counters 25 and 32 respectively. The counters remain at a standstill until the relative preset pulses are received once more (fh1 and fv1).

As already explained, the picture data are organized in memory 8 in groups of 5. Each memory cell contains 8 bits, the 5 most significant of which constitute a group of 5 adjacent picture elements (1=black, 0=bright), whereas the 3 least significant bits supply the color to be given to the 5 picture elements in code. The code is as follows:
white: 000
red: 110
green: 011
blue: 101
cyan: 001
magenta: 100
yellow: 010
black: 111

Coding of black is not indispensable though it may prove useful since it is a free combination.

In this way, a picture containing the six colors and white can be obtained. For a three-color picture, two bits are enough, leaving six bits per cell for information purposes. With the solution chosen, the color must be the same for a group of five picture points. If the same concept is applied to a three-color picture, color is the same for a group of six points. In this case, counter 25 would have to divide by 6 (that is, be preset to two).

Counter 32, which divides by 3, determines the vertical height of a picture element over three scanning lines per half-frame (that is, six interlaced lines per frame). This means a picture of 64 lines of elements takes up 64×6=384 lines per frame of the roughly 575 active lines of a C.C.I.R. Standard G television system frame. If needed, circuit 32 could be made to divide by 4 so as to take up 64×8=512 lines per frame.

For a better resolution, of course, the memory 8 must be provided with a correspondingly greater capacity.

The ROM taken as an example in the table contains an advertising picture for using the set for demonstration purposes such as in shop windows. Many other applications are, of course, possible such as displaying operating instructions for assisting the user in operation of the set. An important point to note in connection with this is that television sets are becoming increasingly sophisticated (multi-channel electronic memories, frequency synthesis with programs called up directly or indirectly from the memory, set operation time programming, teletext reception, built-in digital clock, television games, videodisc combinations, etc.), so that the user requires an increasing amount of help with operation. As a television set is in itself a complicated piece of electronic equipment (probably fitted with character generators and/or microprocessors), it is far safer in the long run to fit it with a device such as described in the present invention. Though the device described in the present application is self-sufficient, it may be simplified in one of the two cases mentioned by using some of the circuits already provided in the set for other purposes, for example, a microprocessor the memory of which is not fully exploited.

The advantages of the present invention will be clear from the description given. To those skilled in the art, it will be clear that a number of variations can be made to the system described without, however, departing rom the scope of the present invention.

For example, instead of displaying the internal picture as an alternative to the received one, it would be a fairly simple matter to display both overlapped. All that is needed to do this is to cut off the connection between circuit elements 105 and 106 so as to prevent the BLANK signal from being applied to the control input of circuit 108.

We claim:
1. A television set, comprising:
picture display means for displaying an image responsive to a signal applied thereto;
first means for receiving a broadcast television signal and generating a first electrical signal representative thereof;
non-volatile memory means for storing coded data representative of at least one predetermined image which is independent of said broadcast television signal for display on said display means;

second means for reading data stored in said memory and for generating a second electrical signal representative thereof;

switching means for selectively applying at least one of said first and second electrical signals to said display means so as to operate said television set in either a first mode of operation, in which only an image represented by said broadcast television signal received by said first means is displayed on said display means, and a second mode of operation, in which only an image represented by data stored in said non-volatile memory is displayed on said display means;

said switching means including a manual three position switch movable between first, second and third positions, said switch means operating said television set in said first mode of operation when said three position switch is in said first position, said switch means operating said television set in said second mode of operation when said three position switch is in a second position, and said switching means alternately operating said television set in said first and said second modes of operation according to a predetermined time pattern, when said three position switch is in said third position.

2. A television set, comprising:

picture display means for displaying an image responsive to a signal applied thereto;

first means for receiving a broadcast television signal and generating a first electrical signal representative thereof;

non-volatile memory means for storing coded data representative of at least one predetermined image which is independent of said broadcast television signal for display on said display means;

second means for reading data stored in said memory and for generating a second electrical signal representative thereof;

switching means for selectively applying at least one of said first and second electrical signals to said display means so as to operate said television set in either a first mode of operation, in which only an image represented by said broadcast television signal received by said first means is displayed on said display means, and a second mode of operation, in which only an image represented by data stored in said non-volatile memory is displayed on said display means;

said switching means including means for alternately operating said television set in said first and second modes of operation according to a predetermined pattern of timing.

3. A television set according to claim 1 or 2, wherein said non-volatile semiconductor comprise a read only memory.

4. A television set according to claim 3, wherein said read only memory has 1024 eight-bit cells, and wherein three of the eight bits of each of said cells are for storing color data.

5. A television set according to claim 1 or 2, wherein said non-volatile semiconductor memory comprises at least two parts, each of which is for storing data representative of a respective complete image, and further comprising additional switching means for determining from which one of said parts stored data are to be read for displaying the respective image which they represent.

6. A television set according to claim 2, wherein said non-volatile semiconductor memory is for storing coded data representative of an image to be displayed containing operating instructions for said television set.

7. A television set according to claim 2, wherein said non-volatile semiconductor is for storing coded data representative of an image to be displayed containing advertising information.

8. A television set, comprising:

a housing;

picture display means for displaying an image responsive to a signal applied thereto;

first means for receiving a broadcast television signal including synchronizing signals and a video signal and for generating a first electrical signal representative of said video signal;

a non-volatile semiconductor memory for storing coded data representative of at least one predetermined image, which is independent of said broadcast television signal, for display on said display means;

second means for reading data stored in said non-volatile semiconductor memory and for generating a second electrical signal representative thereof;

third means responsive to said received broadcast television signal for applying vertical and horizontal synchronizing signals to said display means as a function of said synchronizing signals contained in said received broadcast television signal; and switching means for selectively operating said television set in a first mode of operation in which said first electrical signal is applied to said picture display means and an image represented by said video signal is displayed on said display means and a second mode of operation in which said second electrical signal is applied to said picture display means and an image represented by said data stored in said non-volatile semiconductor memory is displayed on said display means.

9. A television set according to claim 8, wherein said switching means includes means for blanking said first electrical signal while permitting said vertical and horizontal synchronizing signals to be applied to said picture display means when said television set is operated in said second mode of operation.

10. A television set, comprising:

picture display means for displaying an image responsive to a signal applied thereto;

first means for receiving a broadcast television signal and generating a first electrical signal representative thereof;

a non-volatile semiconductor memory for storing coded data representative of a least one predetermined image which is independent of said broadcast television signal for display on said display means, said non-volatile semiconductor memory including a plurality of cells each of which is for storing a binary number at first part of which contains information representative of the individual brightness levels of each one of a plurality of picture elements of an image to be displayed on said display means and a second part of which contains information representative of the single color of all of said plurality of picture elements;

second means for reading data stored in said non-volatile semiconductor memory and for generating a second electrical signal representative thereof; and switching means for selectively applying at least one of said first and second electrical signals to said display means.

* * * * *